United States Patent
Kato

(10) Patent No.: US 9,493,151 B2
(45) Date of Patent: Nov. 15, 2016

(54) CONTROL APPARATUS FOR HYBRID VEHICLE

(75) Inventor: Gen Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/394,986

(22) PCT Filed: Oct. 17, 2011

(86) PCT No.: PCT/JP2011/073829
§ 371 (c)(1),
(2), (4) Date: Mar. 8, 2012

(87) PCT Pub. No.: WO2013/057779
PCT Pub. Date: Apr. 25, 2013

(65) Prior Publication Data
US 2014/0222261 A1    Aug. 7, 2014

(51) Int. Cl.
*B60W 20/00* (2016.01)
*B60K 6/445* (2007.10)
*B60W 10/08* (2006.01)
*B60W 30/20* (2006.01)

(52) U.S. Cl.
CPC ............ *B60W 20/108* (2013.01); *B60K 6/445* (2013.01); *B60W 10/08* (2013.01); *B60W 20/00* (2013.01); *B60W 2030/206* (2013.01); *B60W 2710/085* (2013.01); *Y02T 10/6239* (2013.01); *Y02T 10/7258* (2013.01); *Y10S 903/903* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2,425,650 A | * | 8/1947 | Stalker | B64C 27/001 416/117 |
| 3,158,038 A | * | 11/1964 | Goodman | F16F 15/22 74/570.1 |
| 3,219,120 A | * | 11/1965 | Hooper | B64C 27/001 188/378 |
| 3,412,961 A | * | 11/1968 | Howard | B64D 45/00 244/191 |

(Continued)

FOREIGN PATENT DOCUMENTS

| | | |
|---|---|---|
| JP | A-2004-159404 | 6/2004 |
| JP | A-2004-312857 | 11/2004 |

(Continued)

OTHER PUBLICATIONS

International Search Report issued in International Application No. PCT/JP2011/073829 dated Nov. 22, 2011 (with trans).

*Primary Examiner* — Jean-Paul Cass
(74) *Attorney, Agent, or Firm* — Oliff PLC

(57) ABSTRACT

A control apparatus for a hybrid vehicle includes a torque determining device for determining respective divided torques outputted from a first electric motor and a second electric motor on the basis of total torque required for driving of a hybrid vehicle; a torque correcting device for correcting the respective divided torques of the first electric motor and the second electric motor such that pulsation torque of an internal combustion engine on a drive shaft is canceled by the respective divided torques outputted from the first electric motor and the second electric motor and such that the respective divided torques of the first electric motor and the second electric motor are directed opposite to each other with respect to the drive shaft; and a controlling device for controlling each of the first electric motor and the second electric motor so as to output respective one of the corrected divided torques.

5 Claims, 11 Drawing Sheets

(56) References Cited

U.S. PATENT DOCUMENTS

| | | | | |
|---|---|---|---|---|
| 3,509,971 | A * | 5/1970 | Gerstine | B64C 27/001 188/382 |
| 3,538,469 | A * | 11/1970 | Litte | F16D 37/02 188/267.2 |
| 3,540,809 | A * | 11/1970 | Mard | B64C 27/001 416/1 |
| 4,535,263 | A * | 8/1985 | Avery | H02K 26/00 310/112 |
| 5,667,166 | A * | 9/1997 | Tran | G05D 1/0816 244/195 |
| 6,416,016 | B1 * | 7/2002 | Welsh | B64C 27/001 188/378 |
| 7,199,540 | B2 * | 4/2007 | Yaguchi | H02P 25/098 318/432 |
| 7,877,184 | B2 * | 1/2011 | Watanabe | B60K 6/40 180/247 |
| 8,219,303 | B2 * | 7/2012 | Schwenke | B60K 6/445 701/111 |
| 8,480,364 | B2 * | 7/2013 | Altieri | G01M 1/22 415/119 |
| 8,508,164 | B2 * | 8/2013 | Le Besnerais | H02P 29/0038 318/114 |
| 8,718,854 | B2 * | 5/2014 | Hashimoto | B60K 6/445 701/22 |
| 2003/0139044 | A1 * | 7/2003 | Takeishi | G03F 7/709 438/689 |
| 2005/0115352 | A1 * | 6/2005 | Tanaka | B25J 9/042 74/490.03 |
| 2005/0247503 | A1 * | 11/2005 | Imazu | B60K 6/445 180/300 |
| 2006/0017414 | A1 * | 1/2006 | Joe | B60K 6/445 318/432 |
| 2006/0076914 | A1 * | 4/2006 | Yaguchi | H02P 25/098 318/432 |
| 2006/0224282 | A1 * | 10/2006 | Seo | B60K 6/365 701/22 |
| 2008/0128208 | A1 * | 6/2008 | Ideshio | B60K 6/52 184/6 |
| 2009/0030595 | A1 * | 1/2009 | Sugai | B60K 6/445 701/112 |
| 2009/0321157 | A1 * | 12/2009 | Sowul | B60K 6/365 180/65.22 |
| 2010/0185351 | A1 * | 7/2010 | Uchiyama | B60K 6/445 701/22 |
| 2010/0221096 | A1 * | 9/2010 | Altieri | G01M 1/22 415/1 |
| 2010/0318249 | A1 * | 12/2010 | Jinno | B60K 6/445 701/22 |
| 2011/0215745 | A1 * | 9/2011 | Besnerais | H02P 29/0038 318/400.23 |
| 2013/0173108 | A1 * | 7/2013 | Hashimoto | B60K 6/445 701/22 |

FOREIGN PATENT DOCUMENTS

| | | |
|---|---|---|
| JP | A-2006-067655 | 3/2006 |
| JP | A-2010-023790 | 2/2010 |

* cited by examiner

CONTROL APPARATUS FOR HYBRID VEHICLE

TECHNICAL FIELD

The present invention relates to a control apparatus for a hybrid vehicle which is provided, for example, with an internal combustion engine and an electric motor as power elements.

BACKGROUND ART

In this type of hybrid vehicle, in some cases, vibration is transmitted to a drive shaft in response to a torque pulsation component generated on a crankshaft on the basis of a combustion cycle of the internal combustion engine. Thus, for example, in a patent document 1, there is suggested a technology in which the vibration on the drive shaft is suppressed by outputting torque for canceling the torque pulsation component from the electric motor.

On the other hand, in a patent document 2, there is suggested a technology in which the vibration generated in deactivation of one portion of cylinders in a variable displacement engine or variable cylinder engine is suppressed by controlling the torque outputted from the electric motor.

PRIOR ART DOCUMENT

Patent Document

Patent document 1: Japanese Patent Application Laid Open No. 2010-023790
Patent document 2: Japanese Patent Application Laid Open No. 2006-067655

DISCLOSURE OF INVENTION

Subject to be Solved by the Invention

As described in the patent documents 1 and 2 described above, if the vibration caused by the running of the internal combustion engine is suppressed by the torque outputted from the electric motor, not only one electric motor but also two different electric motor can be used in combination.

However, if the vibration is suppressed by using the two electric motors, for the reason of configuration of a power transmission mechanism, the respective torques outputted from the electric motors are directed in the same direction viewed from their rotating shafts. Thus, respective stator reaction forces of the electric motors are generated in the same direction, possibly resulting in an increase in the vibration of a mount. In other words, the technology described above has such a technical problem that new vibration is generated due to the stator reaction forces of the electric motors even if the vibration caused by the running of the internal combustion engine can be suppressed.

In view of the aforementioned problem, it is therefore an object of the present invention to provide a control apparatus for a hybrid vehicle capable of preferably suppressing the vibration of the drive shaft caused by the torque pulsation and the vibration of the mount caused by the stator reaction forces.

Means for Solving the Subject

The above object of the present invention can be achieved by a control apparatus for a hybrid vehicle, the hybrid vehicle provided with: an internal combustion engine; power elements including a first electric motor and a second electric motor; and a drive shaft for transmitting respective torques outputted from the power elements to an axle, the control apparatus provided with: a torque determining device for determining respective divided torques to be outputted from the first electric motor and the second electric motor on the basis of total torque required for driving of the hybrid vehicle; a torque correcting device for correcting the respective divided torques of the first electric motor and the second electric motor such that pulsation torque of the internal combustion engine on the drive shaft is canceled by the respective divided torques outputted from the first electric motor and the second electric motor and such that the respective divided torques of the first electric motor and the second electric motor are directed opposite to each other with respect to the drive shaft; and a controlling device for controlling each of the first electric motor and the second electric motor so as to output respective one of the corrected divided torques.

The hybrid vehicle of the present invention is a vehicle provided at least with: the internal combustion engine which can adopt various aspects in which a motor generator a fuel type, a fuel supply aspect, a fuel combustion aspect, a configuration of an intake/exhaust system, a cylinder arrangement and the like do not matter; and the first electric motor and the second electric motor each of which can be configured as an electric motor generator, as the power elements capable of supplying power to the drive shaft. Each of the internal combustion engine, the first electric motor, and the second electric motor is coupled with the drive shaft via a power transmission mechanism including a plurality of rotational elements (preferably, gears).

The control apparatus for the hybrid vehicle of the present invention is an apparatus capable of controlling operations of the hybrid vehicle described above, and it can adopt forms of various computer systems or the like, such as microcomputer apparatuses, various controllers, or various processing units like a single or a plurality of electronic controlled units (ECUs), which can include, as occasion demands, one or a plurality of central processing units (CPUs), micro processing units (MPUs), various processors or various controllers, or further, various storage devices or the like, such as a read only memory (ROM), a random access memory (RAM), a buffer memory or a flash memory.

In operation of the control apparatus for the hybrid vehicle of the present invention, firstly, by the torque determining device, the respective divided torques to be outputted from the first electric motor and the second electric motor are determined on the basis of the total torque required for the driving of the hybrid vehicle. Specifically, for example, the total torque required for the driving of the hybrid vehicle is determined on the basis of an accelerator opening degree, a vehicle speed, or the like, and output torque of the internal combustion engine is subtracted from the determined total torque, and then, the respective divided torques of the first electric motor and the second electric motor are determined.

If the respective divided torques are determined on the torque determining device, by the torque correcting device, the respective divided torques of the first electric motor and the second electric motor determined are corrected so as to cancel the pulsation torque of the internal combustion engine on the drive shaft. Specifically, cancel torque for cancelling the pulsation torque of the internal combustion engine (e.g. torque having an opposite phase to that of the pulsation torque of the internal combustion engine) is added to the respective divided torques of the first electric motor and the second electric motor. Incidentally, the term "cancel" herein is a broad concept not only meaning a case where the pulsation torque of the internal combustion engine and the respective divided torques of the first electric motor and the second electric motor completely cancel each other, but also including a case where the pulsation torque of the internal combustion engine is reduced to a greater or lesser degree by the respective divided torques of the first electric motor and the second electric motor.

Moreover, particularly in the present invention, the respective divided torques of the first electric motor and the second electric motor are corrected such that the respective divided torques are directed opposite to each other with respect to the drive shaft of the first electric motor and the second electric motor. In other words, the correction is performed such that the respective torques outputted from the first electric motor and the second electric motor are opposite to each other if it is viewed from a direction along the rotating shafts of the first electric motor and the second electric motor.

If the respective divided torques are corrected on the torque correcting device, by the controlling device, each of the first electric motor and the second electric motor is controlled so as to output respective one of the corrected divided torques. Here, since the cancel torque is added to the corrected divided torques as described above, the corrected divided torques can cancel the pulsation torque of the internal combustion engine and suppress vibration on the drive shaft. Moreover, since the correction is performed such that the respective torques of the first electric motor and the second electric motor are opposite to each other with respect to the rotating shafts, respective stator reaction forces generated on the first electric motor and the second electric motor cancel each other, and thus, mount vibration caused by the stator reaction forces can be suppressed.

As explained above, according to the control apparatus for the hybrid vehicle of the present invention, it is possible to preferably suppress the vibration on the drive shaft caused by the torque pulsation and the mount vibration caused by the stator reaction forces.

In one aspect of the control apparatus for the hybrid vehicle of the present invention, the control apparatus is provided with a driving detecting device for detecting whether or not the hybrid vehicle is driving, the torque determining device determines the divided torques so as to output the torques from both the first electric motor and the second electric motor if the hybrid vehicle is not driving and determines the divided torque so as to output the torque from either the first electric motor or the second electric motor if the hybrid vehicle is driving, and the torque correcting device performs the correction such that the pulsation torque of the internal combustion engine on the drive shaft is canceled by the divided torque outputted from either the first electric motor or the second electric motor if the hybrid vehicle is driving.

According to this aspect, before the respective divided torques of the first electric motor and the second electric motor are determined, it is detected whether or not the hybrid vehicle is driving by the driving detecting device. The driving detecting device detects whether or not the hybrid vehicle is driving by using a range of a shift. However, another parameter such as a vehicle speed may be used to detect whether or not the hybrid vehicle is driving.

If it is detected that the hybrid vehicle is not driving (i.e. is parked), by the torque determining device, the divided torques are determined so as to output the torques from both the first electric motor and the second electric motor. In this case, on the torque correcting device, the correction is performed such that the pulsation torque of the internal combustion engine on the drive shaft is canceled by the respective divided torques of the first electric motor and the second electric motor and such that the respective divided torques of the first electric motor and the second electric motor are opposite to each other with respect to the rotating shafts.

On the other hand, if it is judged that the hybrid vehicle is driving, by the torque determining device, the divided torque is determined so as to output the torque from either the first electric motor or the second electric motor. In this case, on the torque correcting device, the correction is performed such that the pulsation torque of the internal combustion engine on the drive shaft is canceled by the divided torque outputted from either the first electric motor or the second electric motor. In other words, since it is only one of the first electric motor and the second electric motor that outputs the torque, the cancel torque for canceling the pulsation torque is only corrected, and the correction for suppressing the vibration caused by the stator reaction forces is not performed.

Here, if the hybrid vehicle is driving, the vibration caused by the pulsation torque of the internal combustion engine is relatively large, and thus, an influence of the mount vibration caused by the stator reaction forces becomes relatively small. On the other hand, if the hybrid vehicle is not driving, the power transmission mechanism is locked, and thus, the vibration caused by the pulsation torque of the internal combustion engine becomes relatively small, and the influence of the mount vibration caused by the stator reaction forces becomes relatively large. Thus, as described above, by using the first electric motor and the second electric motor in combination only if the vehicle is not driving, it is possible to suppress the vibration more efficiently, and it is also possible to reduce power loss caused by outputting the cancel torques from both of the first electric motor and the second electric motor.

In another aspect of the control apparatus for the hybrid vehicle of the present invention, the control apparatus is provided with a temperature detecting device for detecting temperature of a mount for fixing the power elements to a body of the hybrid vehicle, the torque determining device determines the divided torques so as to output the torques from both the first electric motor and the second electric motor if the temperature of the mount is less than a first threshold value and determines the divided torque so as to output the torque from either the first electric motor or the second electric motor if the temperature of the mount is greater than or equal to the first threshold value, and the torque correcting device performs the correction such that the pulsation torque of the internal combustion engine on the drive shaft is canceled by the divided torque outputted from either the first electric motor or the second electric motor if the temperature of the mount is greater than or equal to the first threshold value.

According to this aspect, before the respective divided torques of the first electric motor and the second electric motor are determined, the temperature of the mount for fixing the power elements to the body of the hybrid vehicle is detected by the temperature detecting device. The temperature detecting device may be a temperature sensor for directly detecting the temperature of the mount, or may be a device for indirectly detecting the temperature of the mount by using another parameter (e.g. a start time of the internal combustion engine, an outside air temperature, an engine coolant temperature, etc.).

Here, if the temperature of the mount is less than the first threshold value, by the torque determining device, the divided torques are determined so as to output the torques from both the first electric motor and the second electric motor. In this case, on the torque correcting device, the correction is performed such that the pulsation torque of the internal combustion engine on the drive shaft is canceled by the respective divided torque of the first electric motor and the second electric motor and such that the respective divided torques of the first electric motor and the second electric motor are opposite to each other with respect to the rotating shafts.

On the other hand, if the temperature of the mount is greater than or equal to the first threshold value, by the torque determining device, the divided torque is determined so as to output the torque from either the first electric motor or the second electric motor. In this case, on the torque correcting device, the correction is performed such that the pulsation torque of the internal combustion engine on the drive shaft is canceled by the divided torque outputted from either the first electric motor or the second electric motor. In other words, since it is only one of the first electric motor and the second electric motor that outputs the torque, the cancel torque for canceling the pulsation torque is only corrected, and the correction for suppressing the vibration caused by the stator reaction forces is not performed.

Here, if the temperature of the mount is relatively low, a vibration transmission characteristic increases because the mount is hardened. In other words, at low mount temperature, the influence of the mount vibration relatively increases in comparison with at high mount temperature. The "first threshold value" described above is a threshold value for judging whether the temperature of the mount is low or high (in other words, whether or not the influence of the mount vibration is large enough to perform the correction), and it is obtained and set experimentally, theoretically, or experientially, on the basis of the vibration transmission characteristic or the like.

As a result, as described above, by using the first electric motor and the second electric motor in combination only if the temperature of the mount is less than the first threshold value, it is possible to suppress the vibration more efficiently, and it is also possible to reduce the power loss caused by outputting the cancel torques from both of the first electric motor and the second electric motor.

In another aspect of the control apparatus for the hybrid vehicle of the present invention, the control apparatus is provided with a rotational fluctuation detecting device for detecting rotational fluctuation of the drive shaft, and the torque correcting device additionally corrects the divided torques to increase a cancel effect for the pulsation torque of the internal combustion engine if the rotational fluctuation of the drive shaft is greater than or equal to a second threshold value even though the divided torques are corrected.

According to this aspect, the rotational fluctuation of the drive shaft is detected by the rotational fluctuation detecting device. The rotational fluctuation detecting device may be a device for directly detecting the rotational fluctuation of the drive shaft, or may be a device for indirectly detecting the rotational fluctuation of the drive shaft by using rotational fluctuation of another site (e.g. an input shaft, etc.).

In this aspect, in particular, if the rotational fluctuation of the drive shaft is greater than or equal to the second threshold value even though the divided torques are corrected, the divided torques are additionally corrected to increase the cancel effect for the pulsation torque of the internal combustion engine, by the torque correcting device. Incidentally, the "second threshold value" is a threshold value for judging whether or not to perform the additional correction by the torque correcting device, and it is obtained and set experimentally, theoretically, or experientially.

As described above, by performing the additional correction by the torque correcting device if the rotational fluctuation of the drive shaft is greater than or equal to the second threshold value, it is possible to suppress the vibration more certainly by the additional correction even if the vibration cannot be sufficiently suppressed by one correction.

In an aspect in which the rotational fluctuation detecting device is provided, as described above, the torque correcting device may stop the correction of the divided torques if the rotational fluctuation of the drive shaft is greater than or equal to a third threshold value even though the divided torques are corrected, and the controlling device may control each of the first electric motor and the second electric motor so as to output the divided torques which are not corrected.

In this case, if the rotational fluctuation of the drive shaft is greater than or equal to the third threshold value even though the divided torques are corrected, the correction performed by the torque correcting device is temporarily stopped. Incidentally, the "third threshold value" is a threshold value for judging an abnormality of the correction performed by the torque correcting device, and it is obtained and set experimentally, theoretically, or experientially.

Then, on the controlling device, each of the first electric motor and the second electric motor is controlled so as to output the divided torques which are not corrected (i.e. the divided torques determined on the torque determining device). By virtue of this, it is possible to preferably detect the abnormality of the correction performed by the torque correcting device (e.g. a control abnormality due to combustion variation of the internal combustion engine in a cold condition, etc.), and if the correction is abnormal, the correction is stopped. Thus, it is possible to prevent a problem caused by that the abnormal control continues to be performed.

The operation and other advantages of the present invention will become more apparent from Mode for Carrying Out the Invention explained below.

MODE FOR CARRYING OUT THE INVENTION

Hereinafter, an embodiment of the present invention will be explained with reference to the drawings.

Figure 1:
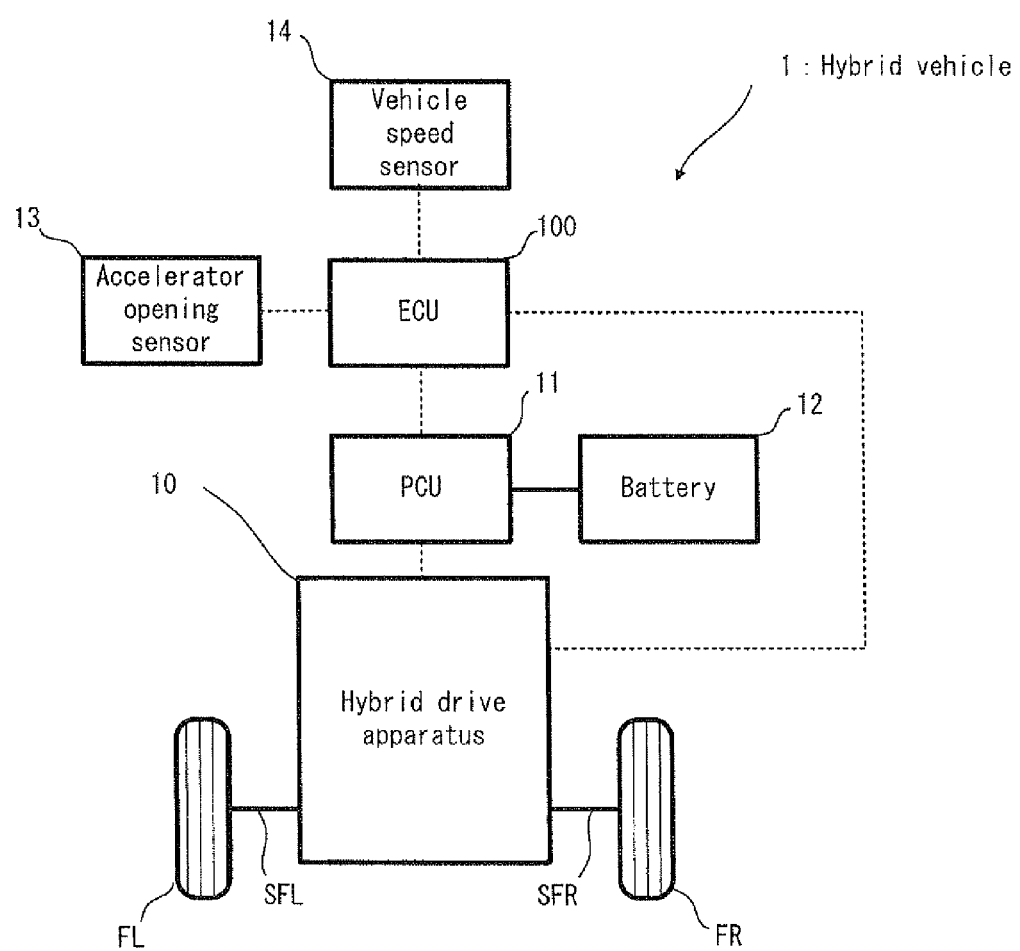
FIG. 1 is a schematic diagram showing an entire configuration of a vehicle in which a control apparatus for a hybrid vehicle in an embodiment is installed.

Firstly, with reference to FIG. 1, an explanation will be given to an entire configuration of a vehicle in which a control apparatus for a hybrid vehicle in an embodiment is installed. FIG. 1 is a schematic diagram showing the entire configuration of the vehicle in which the control apparatus for the hybrid vehicle in the embodiment is installed.

In FIG. 1, a hybrid vehicle 1 in the embodiment is provided with a hybrid drive apparatus 10; a power control unit (PCU) 11; a battery 12; an accelerator opening sensor 13; a vehicle speed sensor 14; and an ECU 100.

The ECU 100 is provided with a CPU, a ROM, a RAM and the like. The ECU 100 is an electronic control unit capable of controlling the operations of each unit of the hybrid vehicle 1, and it is one example of the "control apparatus for the hybrid vehicle" of the present invention. The ECU 100 can perform various controls in the hybrid vehicle in accordance with a control program stored, for example, in the ROM or the like.

The PCU 11 converts direct-current (DC) power extracted from the battery 12 to alternating-current (AC) power and supplies it to a motor generator MG1 and a motor generator MG2 described later. The PCU 11 also includes a not-illustrated inverter which can convert AC power generated by the motor generator MG1 and the motor generator MG2 to DC power and supply it to the battery 12. In other words, the PCU 11 is a power control unit capable of controlling the input/output of the electric power between the battery 12 and each motor generator, or the input/output of the electric power between the motor generators (i.e. in this case, the electric power is transferred between the motor generators without via the battery 12). The PCU 11 is electrically connected to the ECU 100, and the operations thereof are controlled by the ECU 100.

The battery 12 is a chargeable storage battery device which functions as a power supply source associated with the electric power for the power running of the motor generator MG 1 and the motor generator MG2. The amount of storage of the battery 12 can be detected by the ECU 100 or the like.

The accelerator opening sensor 13 is a sensor capable of detecting an accelerator opening degree Ta which is the operation amount of a not-illustrated accelerator pedal of the hybrid vehicle 1. The accelerator opening sensor 13 is electrically connected to the ECU 100, and the detected accelerator opening degree Ta is referred to by the ECU 100 with a regular or irregular period.

The vehicle speed sensor 14 is a sensor capable of detecting a vehicle speed V of the hybrid vehicle 1. The vehicle speed sensor 14 is electrically connected to the ECU 100, and the detected vehicle speed V is referred to by the ECU 100 with a constant or irregular period.

Figure 2:
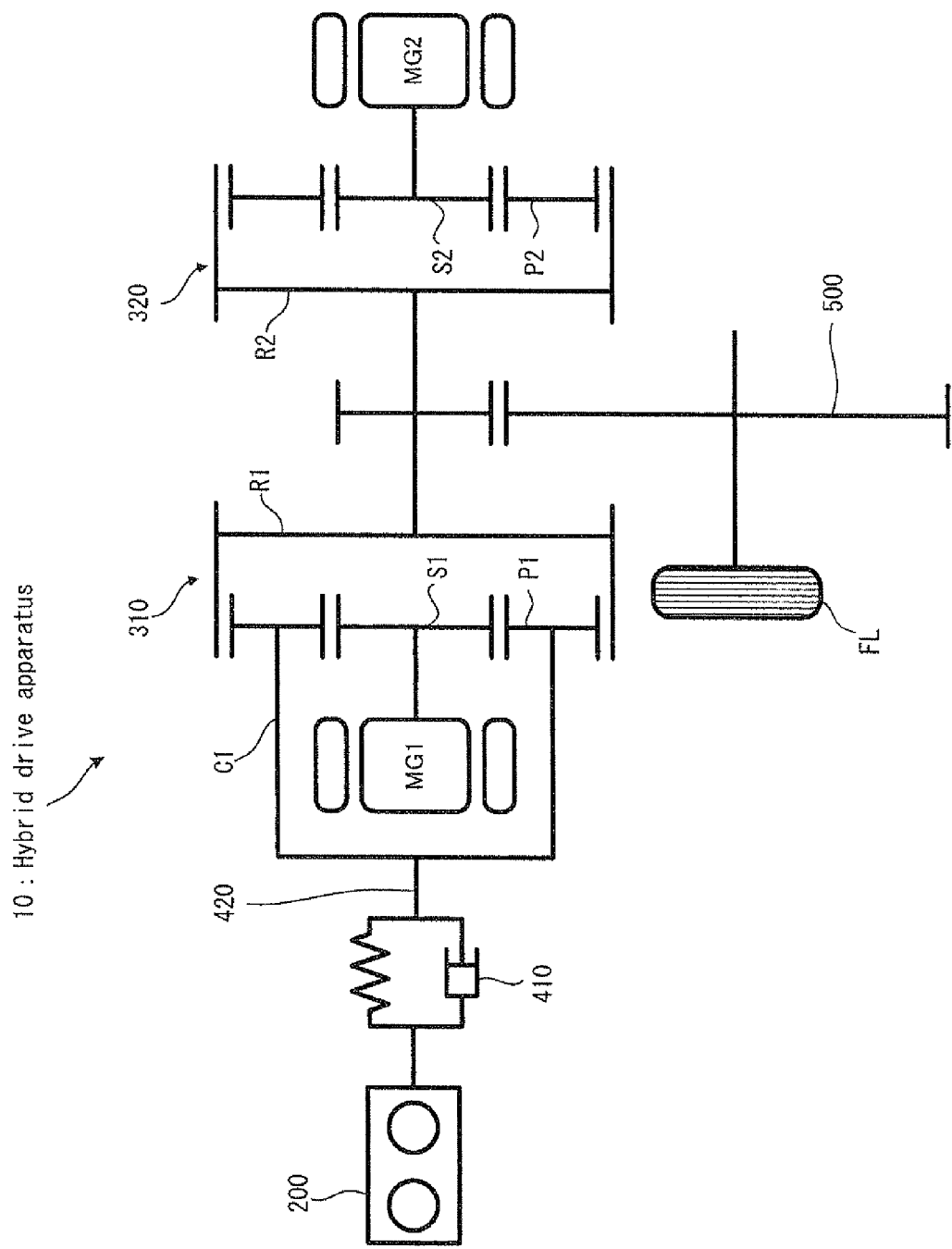
FIG. 2 is a schematic configuration diagram conceptually showing a configuration of a hybrid drive apparatus in the embodiment.

The hybrid drive apparatus 10 is a power unit which functions as a power train of the hybrid vehicle 1. Now, the detailed configuration of the hybrid drive apparatus 10 will be explained with reference to FIG. 2. FIG. 2 is a schematic configuration diagram conceptually showing the configuration of the hybrid drive apparatus 10 in the embodiment.

In FIG. 2, the hybrid drive apparatus 10 is provided mainly with an engine 200; a MG1-side power transmission mechanism 310; a MG2-side power transmission mechanism 320; a damper 410; a motor generator MG1 (hereinafter abbreviated to as a "MG1" as occasion demands), a motor generator MG2 (hereinafter abbreviated to as a "MG2" as occasion demands), an input shaft 420, and a drive shaft 500.

The engine 200 is a gasoline engine as one example of the "internal combustion engine" of the present invention, and it functions as a main power source of the hybrid vehicle 1. Incidentally, the "internal combustion engine" of the present invention is typically a straight two engine; however, as long as it is an engine which generates pulsation torque described later, the internal combustion engine may have a different configuration such as an in-line four-cycle engine.

The engine 200 is configured to burn an air-fuel mixture through an ignition operation performed by an ignition apparatus in which one portion of an ignition plug or spark plug is exposed to a combustion chamber in a cylinder. At the same time, the engine 200 is configured to convert a reciprocating motion of a piston generated in accordance with an explosive power caused by the combustion, to a rotary motion of a crankshaft via a connecting rod.

In the vicinity of the crankshaft, a crank position sensor for detecting a rotational position of the crankshaft (i.e. a crank angle) is placed. The crank position sensor is electrically connected to the ECU 100. In the ECU 100, an engine rotational speed NE of the engine 200 is calculated on the basis of a crank angle signal outputted from the crank position sensor.

The engine 200 is configured to output power to the MG1-side power transmission mechanism 310 via the damper 410 and the input shaft 420.

The MG1-side power transmission mechanism 310 is provided with: a sun gear S1 disposed in the central part; a ring gear R1 concentrically disposed on the outer circumference of the sun gear S1; a plurality of pinion gears P1, each of which is disposed between the sun gear S1 and the ring gear R1 and each of which revolves around the sun gear S1 on the outer circumference of the sun gear S1 while rotating on its axis; and a carrier C1 for supporting the rotating shaft of each pinion gear.

The sun gear S1 is coupled with a rotor of the MG1 via a sun gear shaft. Moreover, the ring gear R1 is coupled with the drive shaft 500. Furthermore, the carrier C1 is coupled with the input shaft 420 of the engine 200.

The MG2-side power transmission mechanism 320 is provided with: a sun gear S2 disposed in the central part; a ring gear R2 concentrically disposed on the outer circumference of the sun gear S2; and a plurality of pinion gears P2, each of which is disposed between the sun gear S2 and the ring gear R2 and each of which revolves around the sun gear S2 on the outer circumference of the sun gear S2 while rotating on its axis.

The sun gear S2 is coupled with a rotor of the MG2 via a sun gear shaft. Moreover, the ring gear R2 is coupled with the drive shaft 500.

The motor generator MG1 is an electric motor generator provided with: a power running function for converting electrical energy into kinetic energy; and a regeneration function for converting the kinetic energy into the electrical energy. The motor generator MG2, as in the motor generator MG1, is an electric motor generator provided with: the power running function for converting the electrical energy into the kinetic energy; and the regeneration function for converting the kinetic energy into the electrical energy.

Incidentally, each of the motor generators MG1 and MG2 is configured as, for example, a synchronous electric motor generator, and it is provided with: a rotor having a plurality of permanent magnets on the outer circumferential surface; and a stator around which a three-phase coil for forming a rotating magnetic field is formed; however, it may have another configuration. The motor generators MG1 and MG2 are one example of the "first electric motor" and the "second electric motor" of the present invention, respectively.

The motor generators MG1 and MG2 are arranged typically such that rotating shafts thereof are equal to each other. Here, the expression that "the rotating shafts are equal" is a broad concept not only meaning that the rotating shafts are completely identical but also including a state in which the rotating shafts are mutually close enough to generate vibration caused by stator reaction forces. In this case, in particular, it is possible to significantly produce an effect of suppression of the vibration by the stator reaction forces associated with the embodiment.

The drive shaft 500 is one example of the "drive shaft" of the present invention. The drive shaft 500 is coupled with drive shafts SFR and SFL (refer to FIG. 1) for driving a right front wheel FR and a left front wheel FL, respectively, which are the drive wheels of the hybrid vehicle 1.

Figure 3:
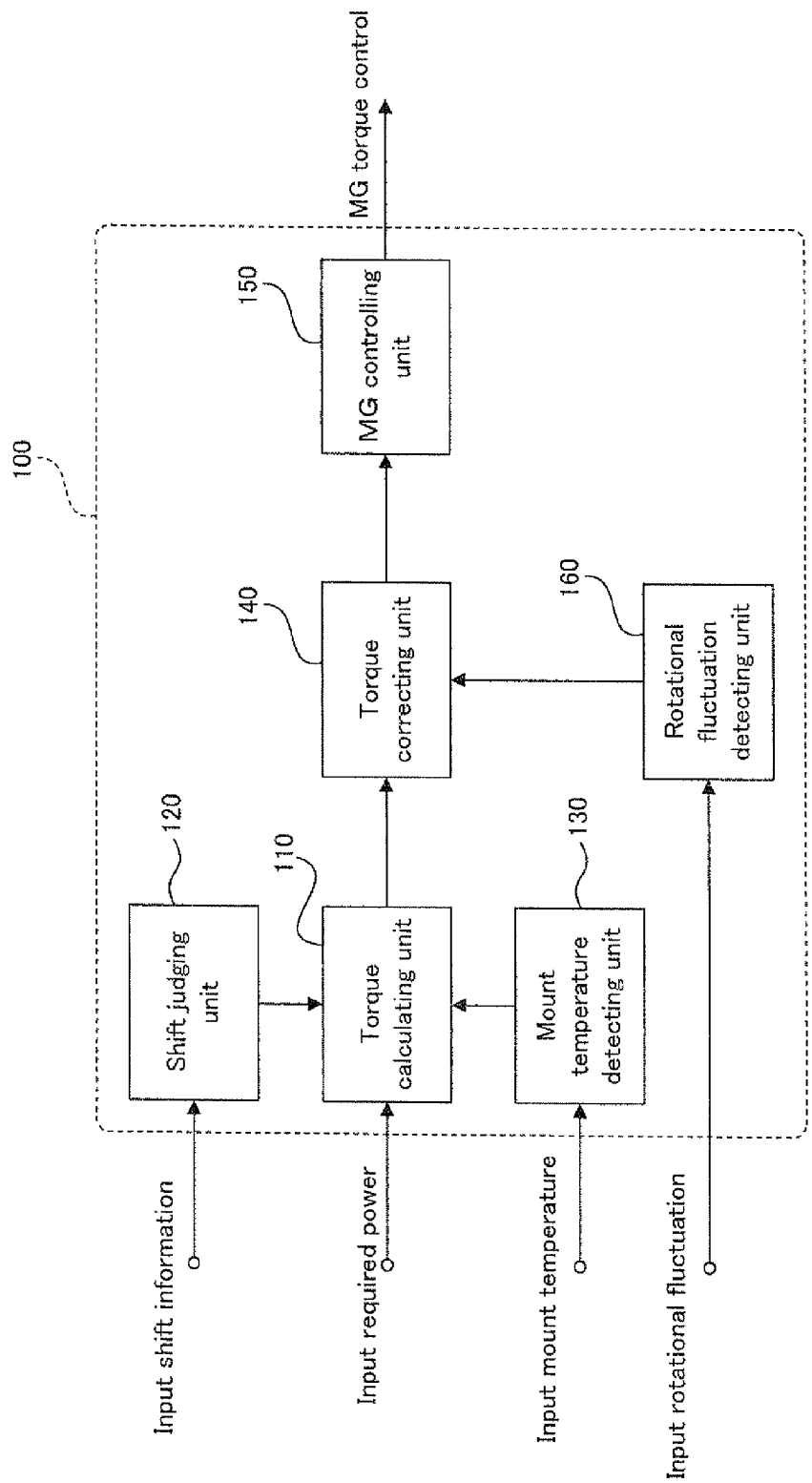
FIG. 3 is a block diagram showing a configuration of an ECU in the embodiment.

Next, the detailed configuration of the ECU 100, which is the control apparatus for the hybrid vehicle in the embodiment, will be explained with reference to FIG. 3. FIG. 3 is a block diagram showing the configuration of the ECU in the embodiment.

In FIG. 3, the ECU 100 is provided with: a torque calculating unit 110; a shift judging unit 120; a mount temperature detecting unit 130; a torque correcting unit 140; a MG controlling unit 150; and a rotational fluctuation detecting unit 160.

The torque calculating unit 110 is one example of the "torque determining device" of the present invention and calculates torques to be outputted from the MG1 and the MG2, in accordance with required power for the hybrid vehicle 1 obtained, for example, from the accelerator operation amount, the vehicle speed, or the like. Torque values calculated on the torque calculating unit 110 are outputted to the torque correcting unit 140.

The shift judging unit 120 is one example of the "driving detecting device" of the present invention and judges the state of a shift of the hybrid vehicle. Specifically, the shift judging unit 120 judges whether the shift is in a D range or R range indicating that the vehicle is driving, or in a P range indicating that the vehicle is parked. A judgment result of the shift judging unit 120 is outputted to the torque calculating unit 110.

The mount temperature detecting unit 130 is one example of the "temperature detecting device" and detects temperature of a mount in the hybrid vehicle 1. The mount temperature detecting unit 130 estimates the temperature of the mount by using, for example, a start time of the internal combustion engine, an outside air temperature, an engine coolant temperature, and the like. The mount temperature detected on the mount temperature detecting unit 130 is outputted to the torque calculating unit 110.

The torque correcting unit 140 is one example of the "torque correcting device" of the present invention and corrects the torque values to be outputted from the MG1 and the MG2 calculated on the torque calculating unit 110. The details of the correction on the torque correcting unit 140 will be described later. The torque values corrected on the torque correcting unit 140 are outputted to the MG controlling unit 150.

The MG controlling unit 150 is one example of the "controlling device" of the present invention and controls each of the MG1 and the MG2 to output the torque corrected by the torque correcting unit 140.

The rotational fluctuation detecting unit 160 is one example of the "rotational fluctuation detecting device" of the present invention and detects rotational fluctuation of the input shaft 420 (refer to FIG. 2) and outputs it to the torque correcting unit 140. The rotational fluctuation detecting unit 160 detects the rotational fluctuation of the input shaft 420, for example, on the basis of a value of a resolver or the like disposed in the MG1.

The ECU 100 including each of the aforementioned units is an integrally-configured electronic control unit, and all the operations associated with each of the aforementioned units are performed by the ECU 100. However, the physical, mechanical and electrical configurations of each of the aforementioned units of the present invention are not limited to this example. For example, each of the units may be configured as various computer systems such as a plurality of ECUs, various processing units, various controllers or microcomputer apparatuses.

Figure 4:
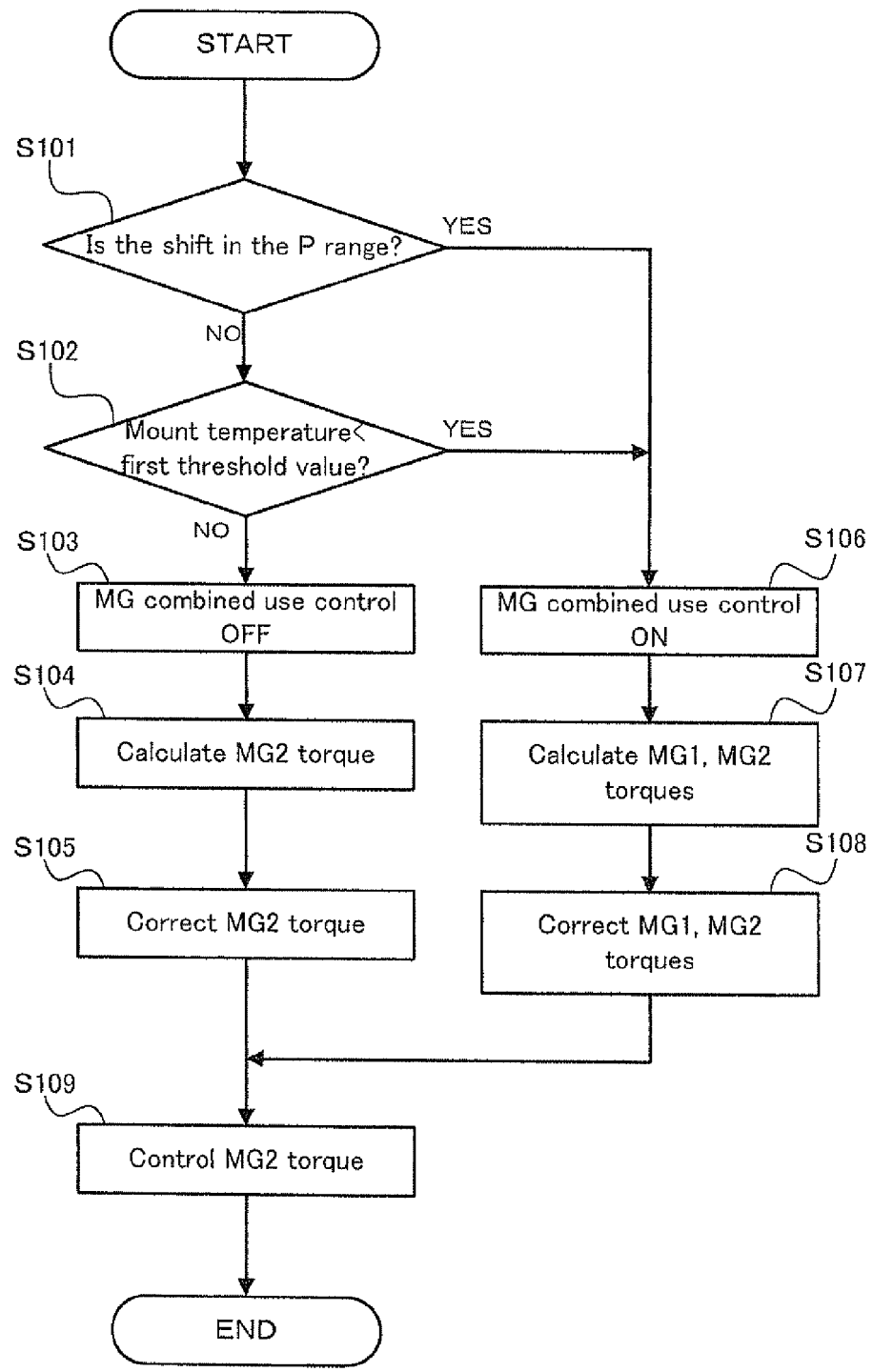
FIG. 4 is a flowchart (part 1) showing operations of the control apparatus for the hybrid vehicle in the embodiment.

Next, operations of the control apparatus for the hybrid vehicle in the embodiment will be explained with reference to FIG. 4. FIG. 4 is a flowchart (part 1) showing the operations of the control apparatus for the hybrid vehicle in the embodiment.

In FIG. 4, in operation of the control apparatus for the hybrid vehicle in the embodiment, firstly, it is detected whether or not the shift of the hybrid vehicle 1 is in the P range on the shift judging unit 120 (step S101). Then, if the shift of the hybrid vehicle 1 is not in the P range (e.g. is in the D range, the R range, etc.) (the step S101: NO), the temperature of the mount of the hybrid vehicle 1 is detected on the mount temperature detecting unit 130 and it is judged whether or not the detected mount temperature is less than a first threshold value (step S102). Incidentally, the first threshold value is set in advance as a threshold value for judging whether or not the detected mount temperature is a temperature at which MG combined use control described later is to be performed.

Here, if the detected mount temperature is not less than the first threshold value (the step S102: NO), the MG combined use control is set OFF (step S103), the torque of the MG2 alone is calculated on the torque calculating unit 110 (step S104). In this case, on the torque correcting unit 140, correction of adding cancel torque for canceling the torque pulsation of the drive shaft 500 is performed on the calculated torque value of the MG2 (step S105).

On the other hand, if the shift of the hybrid vehicle 1 is in the P range (the step S101: YES), or if the mount temperature is less than the first threshold value (the step S102: YES), the MG combined use control is set ON (step S106), and each of the torques of the MG1 and the MG2 is calculated on the torque calculating unit 110 (step S107).

Figure 5:
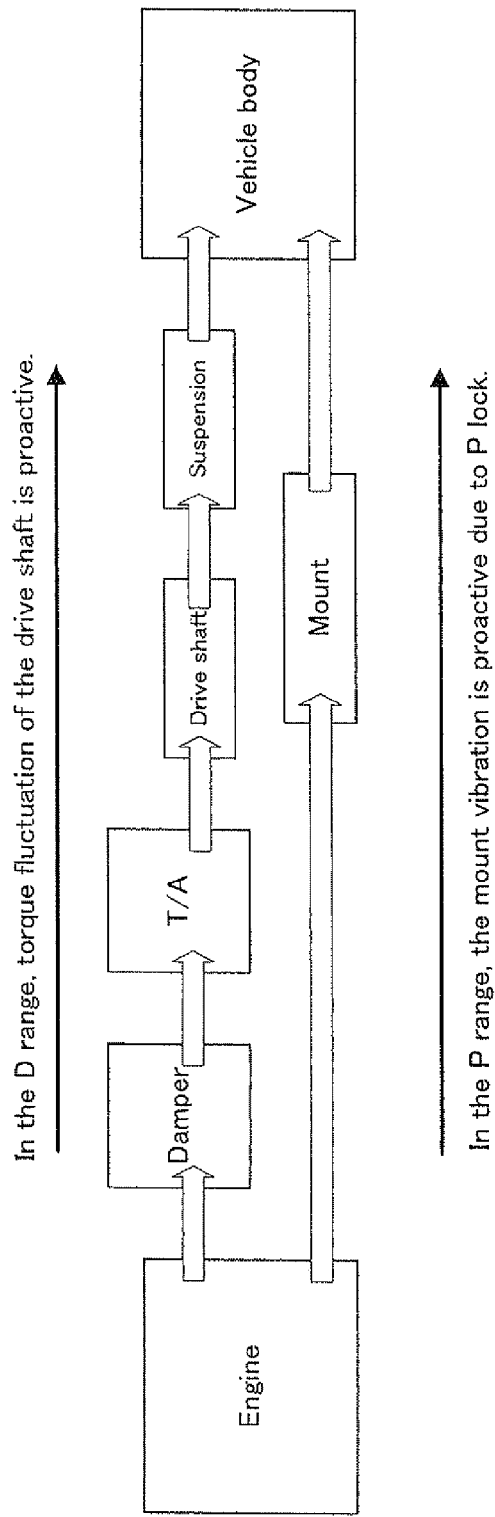
FIG. 5 is a conceptual view showing a transmission path of vibration to a vehicle body from an engine.
Figure 6:
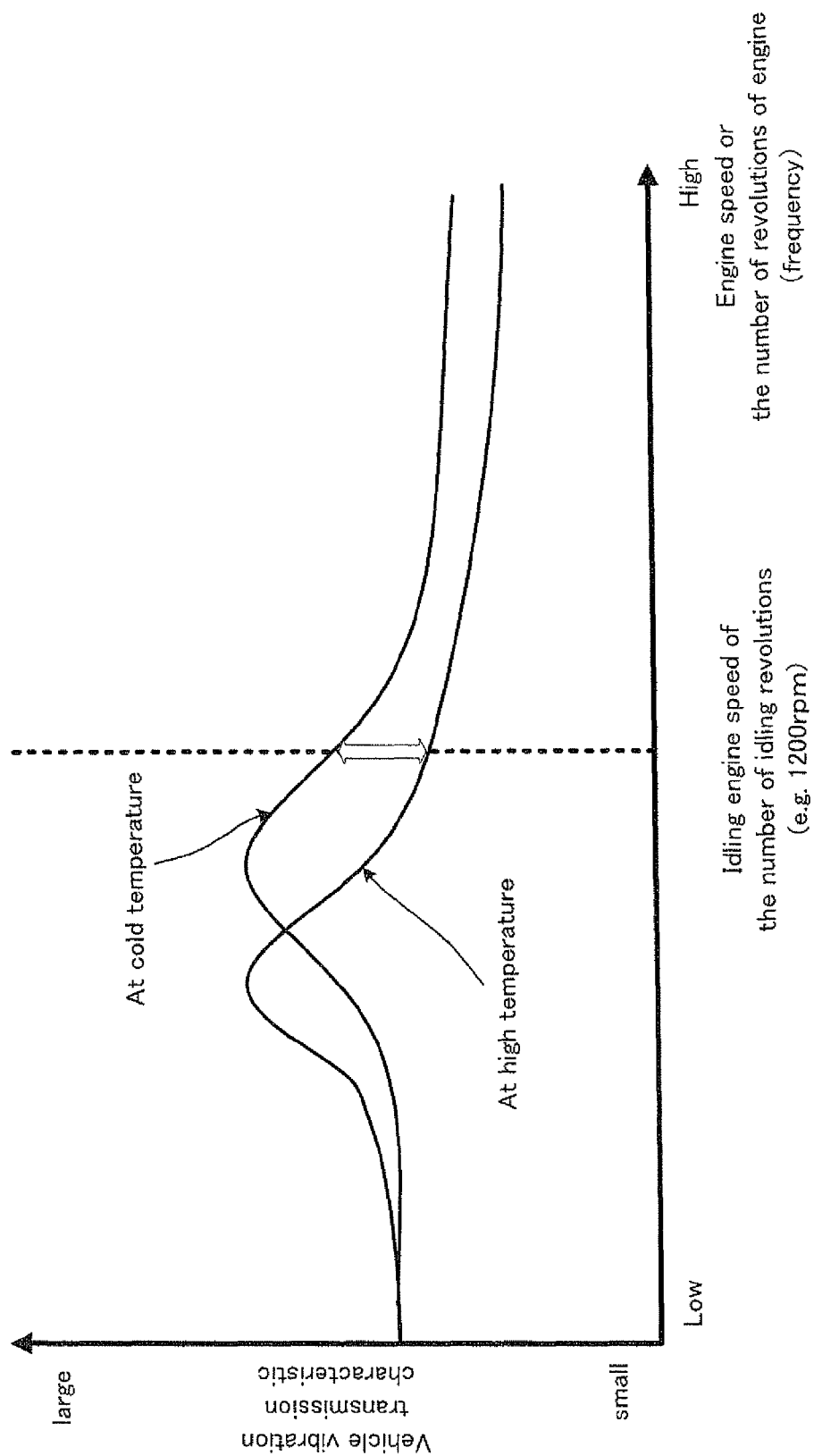
FIG. 6 is a graph showing a relation between an engine speed or the number of revolutions of the engine and a vibration transmission characteristic of the vehicle.

Now, with reference to FIG. 5 and FIG. 6, an explanation will be given to an effect of changing the ON/OFF of the MG combined use control described above. FIG. 5 is a conceptual view showing a transmission path of vibration to a vehicle body from the engine. FIG. 6 is a graph showing a relation between an engine speed or the number of revolutions of the engine and a vibration transmission characteristic of the vehicle.

As shown in FIG. 5, the vibration transmitted to the vehicle body from the engine includes vibration caused by the pulsation torque transmitted through the drive shaft 500 and mount vibration caused by the stator reaction forces of the MG1 and the MG2. In particular, if the shift of the hybrid vehicle 1 is in the D range (i.e. the hybrid vehicle is driving), the vibration transmitted through the drive shaft 500 relatively increases. On the other hand, if the shift of the hybrid vehicle 1 is in the P range (i.e. the hybrid vehicle is parked), the mount vibration relatively increases because the hybrid drive apparatus 10 is locked.

Thus, if the MG combined use control having the effect of suppression of the vibration of the drive shaft 500 and the mount vibration as described later is performed only when the hybrid vehicle is not driving, it is possible to suppress the vibration more efficiently and to reduce power loss caused by outputting the cancel torques from both of the MG1 and the MG2.

Moreover, as shown in FIG. 6, the vibration transmission characteristic (in other words, vibration transmittability) of the hybrid vehicle 1 varies depending on the temperature of the mount. Specifically, as shown in the drawing, the vibration transmission characteristic over an idling engine speed or the number of idling revolutions is larger at low mount temperature than that at high mount temperature. In other words, if the mount temperature is low, the mount hardens and facilitates the transmission of the vibration.

Thus, if the MG combined use control having the effect of the suppression of the vibration of the drive shaft 500 and the mount vibration as described later is performed only when the mount temperature is low (i.e. if the mount temperature is less than the first threshold value), it is possible to suppress the vibration more efficiently and to reduce the power loss by outputting the cancel torques from both of the MG1 and the MG2.

Back in FIG. 4, if the MG combined use control is set ON, on the torque correcting unit 140, the cancel torques for canceling the torque pulsation of the drive shaft 500 are added to the calculated torque values of the MG1 and the MG2, and correction is performed such that the torques of the MG1 and the MG2 are directed opposite to each other viewed from the respective rotating shafts (step S108).

Figure 7:
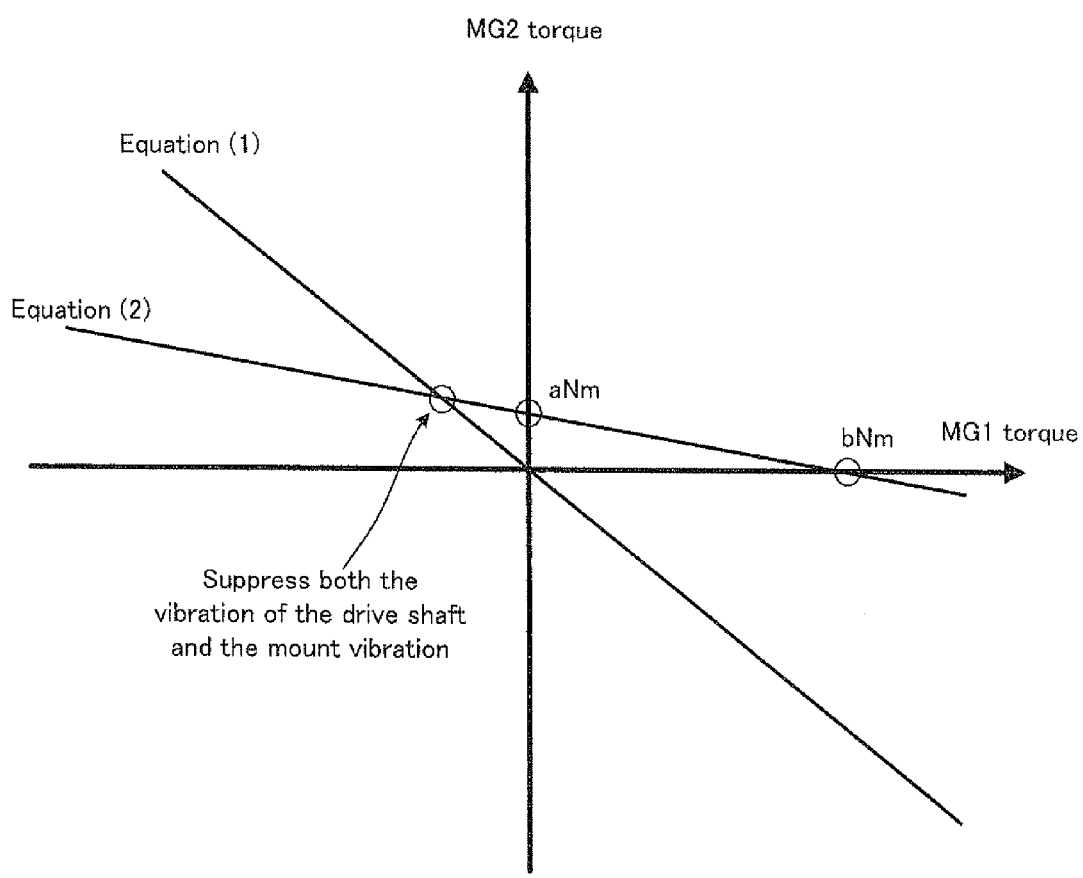
FIG. 7 is a graph showing a method of calculating MG torque by correction.

Now, with reference to FIG. 7, an explanation will be given to a specific method of correcting the torques on the torque correcting unit 140 when the MG combined use control is ON. FIG. 7 is a graph showing a method of calculating the MG torque by the correction.

In FIG. 7, on the torque correcting unit 140, the following equation (1) is stored in order to calculate torque values for canceling the mount vibration caused by the stator reaction forces of the MG1 and the MG2.

$$Tm = -Tg \quad (1)$$

Incidentally, "Tm" in the equation indicates the torque of the MG1, and "Tg" indicates the torque of the MG2.

Moreover, on the torque correcting unit 140, the following equation (2) is stored in order to calculate torque values for canceling the vibration caused by the pulsation torque on the drive shaft 500.

$$Tm = -(a/b) \times Tg + a \quad (2)$$

Incidentally, each of symbols "a" and "b" corresponds to respective one of the torque values obtained if the vibration is cancelled by each of the MG1 and the MG2 alone. Thus, the equation (2) varies depending on an operating situation of the hybrid vehicle 1. Incidentally, a relation between "a" and "b" is a<b, as is clear from the drawing.

The torque correcting unit 140 uses the equation (1) and the equation (2) described above to calculate torque values indicated by an intersection of lines indicating the two equations as the corrected torque values. According to the torque values obtained in this manner, it is possible to suppress both the the vibration caused by the pulsation torque on the drive shaft 500 and the mount vibration caused by the stator reaction forces of the MG1 and the MG2.

Figure 8:
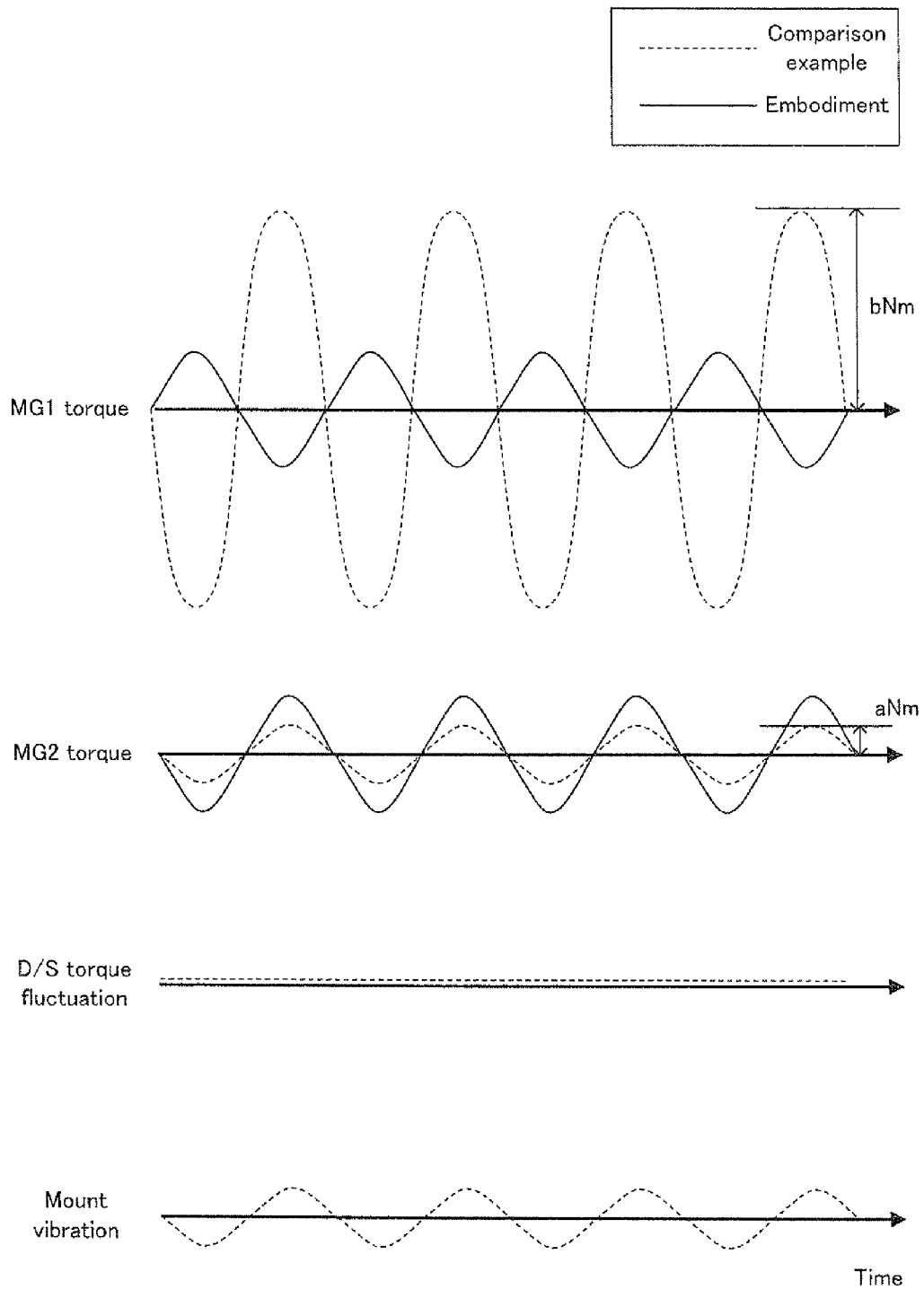
FIG. 8 is a chart showing a relation between each MG torque and generation of the vibration in a comparative example and the embodiment.

Back in FIG. 4, if the correction of the torque values is ended, each of the MG1 and the MG2 is controlled to realize the corrected torque values, by the MG controlling unit 150 (step S109). Now, with reference to FIG. 8, a difference between the embodiment in which the MG combined use control described above is performed and a comparative example in which the MG combined use control is not performed will be explained by giving a specific example. FIG. 8 is a chart showing a relation between each MG torque and generation of the vibration in the comparative example and the embodiment.

In FIG. 8, in the comparison example in which the MG combined use control is not performed (refer to a dashed line in the drawing), if it is tried to suppress the vibration of the drive shaft 500 by using the MG1 alone, it is required to output a torque of bNm, as also shown in FIG. 7. Moreover, if it is tried to suppress the vibration of the drive shaft 500 by using the MG2 alone, it is required to output a torque of aNm. In this case, although the vibration of the drive shaft 500 (i.e. torque fluctuation caused by the pulsation torque) can be suppressed, the mount vibration is generated because the stator reaction forces of the MG1 and the MG2 act in the same direction.

On the other hand, in the embodiment in which the MG combined use control is performed (refer to a solid line in the drawing), a torque of slightly over aNm is outputted from each of the MG1 and the MG2, as also shown in FIG. 7. Here, in particular, since the torques outputted from the MG1 and the MG2 are directed opposite to each other (specifically, the torque of the MG1 is directed in the opposite direction in comparison with the comparative example), the stator reaction forces of the MG1 and the MG2 are mutually canceled. Thus, in addition to the vibration of the drive shaft 500, the generation of the mount vibration can be also suppressed.

Figure 9:
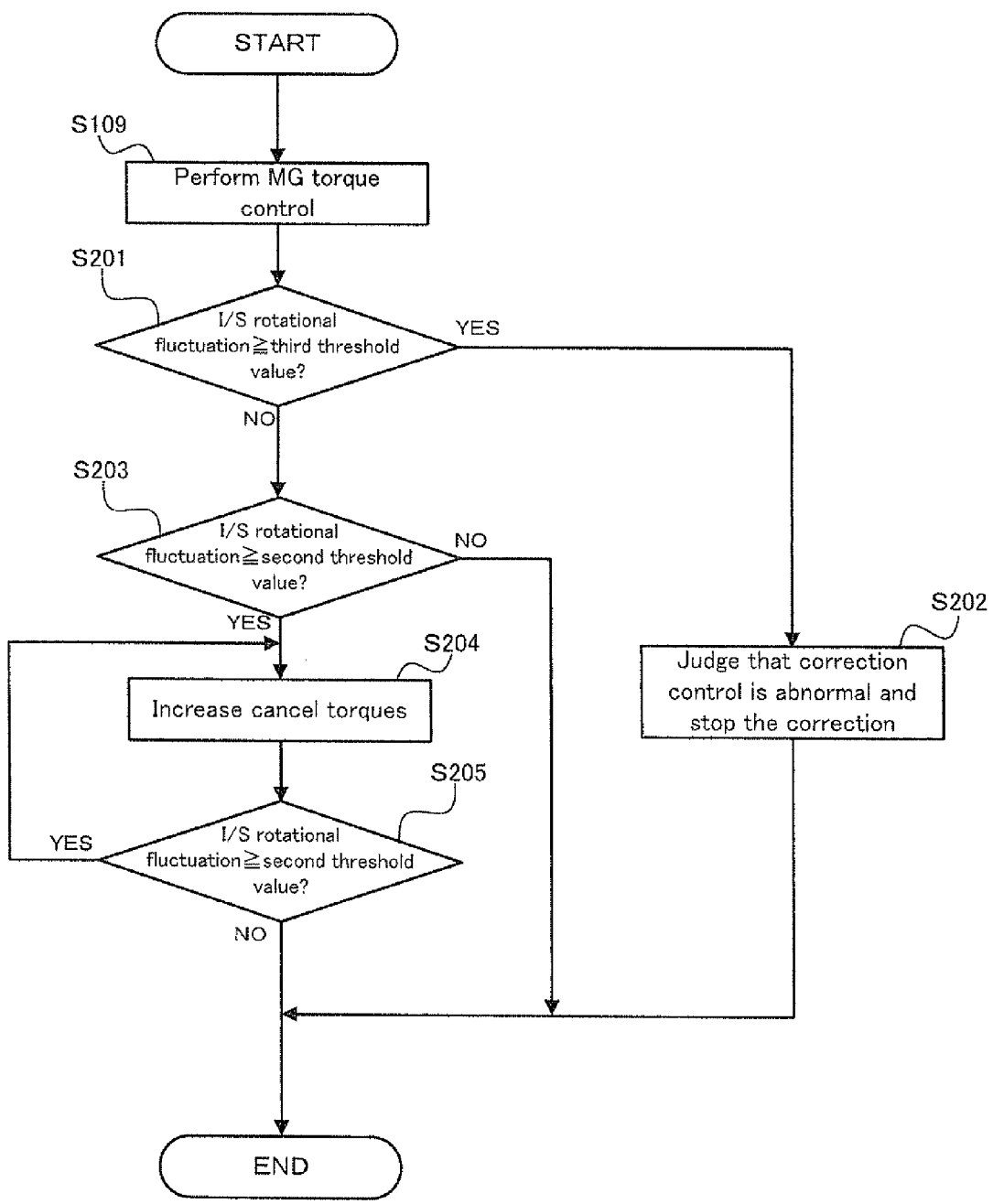
FIG. 9 is a flowchart (part 2) showing the operations of the control apparatus for the hybrid vehicle in the embodiment.

Next, the operations of the control apparatus for the hybrid vehicle during the MG combined use control described above will be explained with reference to FIG. 9. FIG. 9 is a flowchart (part 2) showing the operations of the control apparatus for the hybrid vehicle in the embodiment.

In FIG. 9, during the execution of the control of the MG2, the rotational fluctuation of the input shaft 420 is detected by the rotational fluctuation detecting unit 160. Incidentally, the rotational fluctuation of the input shaft 420 is detected in order to estimate rotational fluctuation of the drive shaft 500. Thus, for example, instead of the rotational fluctuation of the input shaft 420, the rotational fluctuation of the drive shaft 500 may be directly detected, or rotational fluctuation of another shaft which depends on the rotational fluctuation of the drive shaft 500 or the like may be detected.

If the rotational fluctuation of the input shaft 420 is detected, it is judged whether or not the detected rotational fluctuation is greater than or equal to a third threshold value (step S201). Incidentally, the third threshold value is set in advance as a threshold value for judging whether or not there is an abnormality in torque control for the MG1 and the MG2.

Here, if the detected rotational fluctuation is greater than or equal to the third threshold value (the step S201: YES), it is judged that there is an abnormality in the torque control for the MG1 and the MG2, and the correction by the torque correcting unit 140 is temporarily stopped (step S202). In other words, on the MG controlling unit 150, control is performed so as to output the torque values calculated on the toque calculating unit 110. This makes it possible to prevent a problem caused by that the abnormal torque control continues to be performed. Incidentally, as the abnormality of the torque control, for example, an abnormality due to engine combustion variation in a cold condition or the like can be listed.

On the other hand, if the detected rotational fluctuation is less than the third threshold value (the step S201: NO), it is judged whether or not the detected rotational fluctuation is greater than or equal to a second threshold value (step S203). Incidentally, here, the second threshold value is set in advance as a threshold value for judging whether or not additional torque correction described later is performed.

Figure 10:
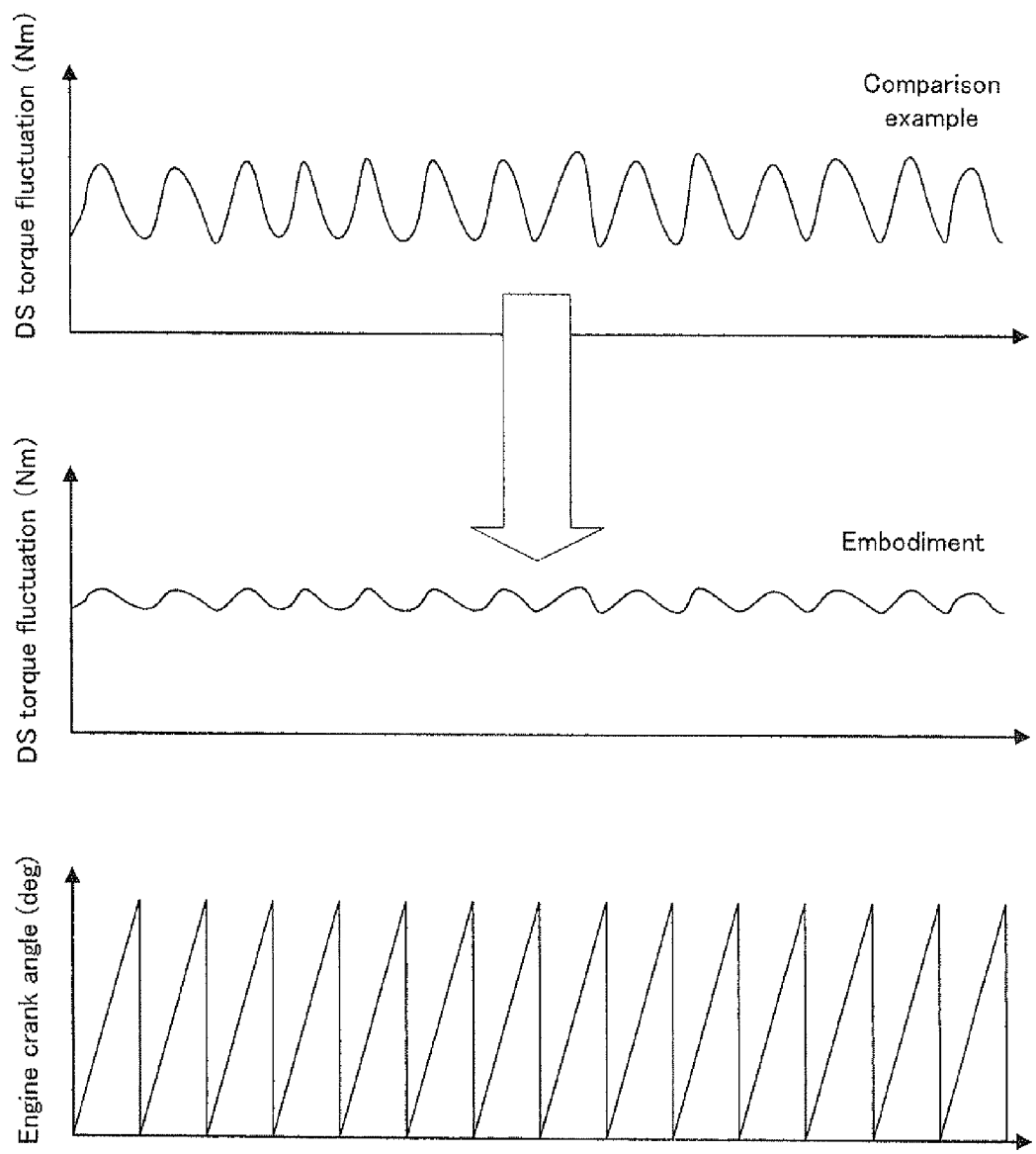
FIG. 10 is a graph showing rotational fluctuation of a drive shaft in the comparative example and the embodiment.
Figure 11:
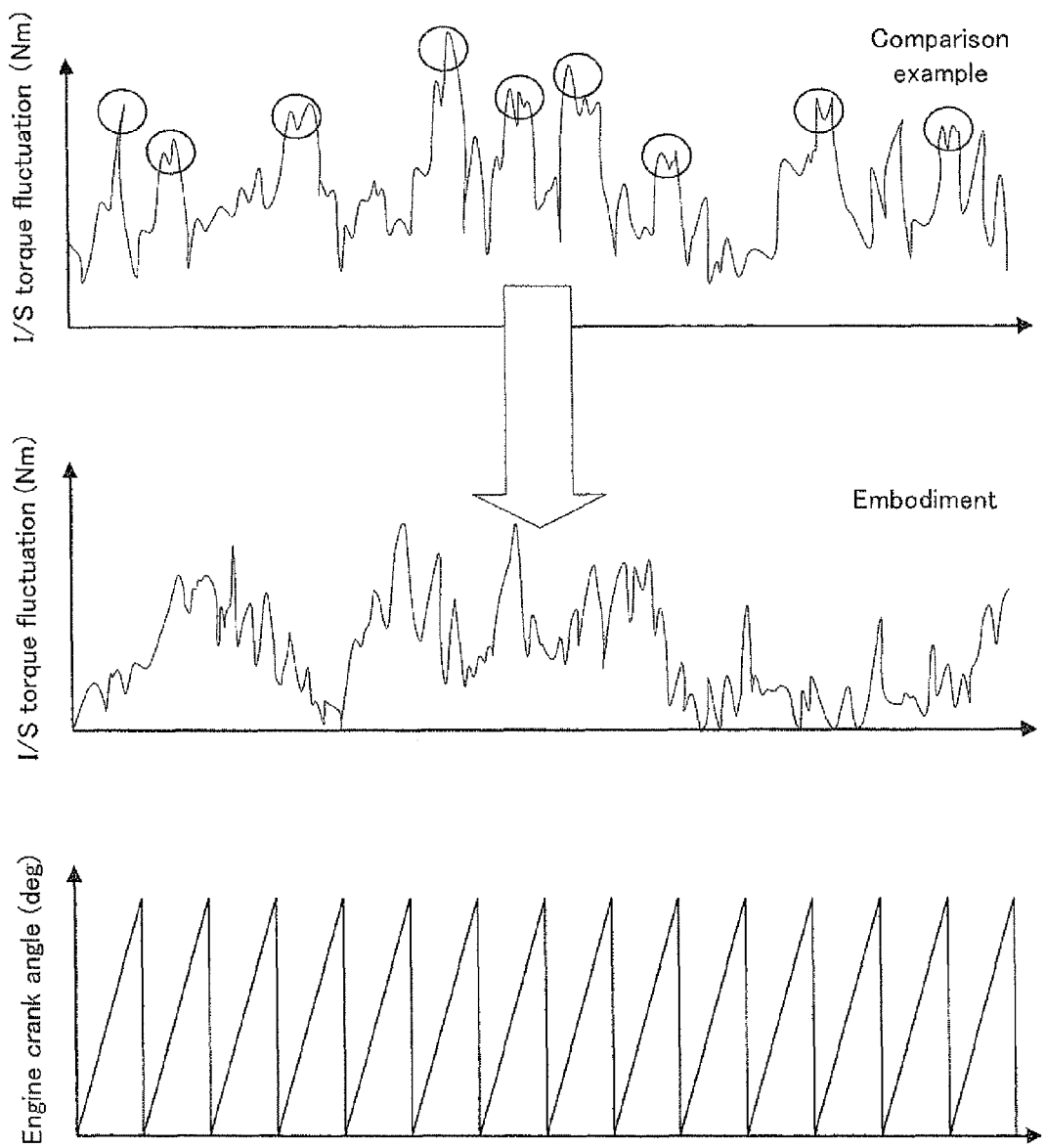
FIG. 11 is a graph showing rotational fluctuation of an input shaft in the comparative example and the embodiment.

Here, the judgment for the rotational fluctuation will be specifically explained with reference to FIG. 10 and FIG. 11. FIG. 10 is a graph showing the rotational fluctuation of the drive shaft in the comparative example and the embodiment. FIG. 11 is a graph showing the rotational fluctuation of the input shaft in the comparative example and the embodiment.

In FIG. 10, between the comparative example in which the torque correction for suppressing the vibration of the drive shaft 500 is not performed and the embodiment in which the torque correction is performed, there is a difference as shown in the drawing in the torque fluctuation of the drive shaft 500; namely, in the embodiment, the vibration of the drive shaft 500 due to the pulsation torque of the engine is smaller than that in the comparison example due to the effect of the correction.

In FIG. 11, as described above, the rotational fluctuation of the drive shaft 500 also corresponds to the rotational fluctuation of the input shaft 420. Thus, in the comparative example in which the torque correction is not performed, the torque fluctuation of the input shaft 420 has many peaks corresponding to primary rotational vibration of the engine 200 (circled portions in the drawing). On the other hand, in the embodiment in which the torque correction is performed, the peaks corresponding to the primary rotational vibration of the engine 200 are reduced.

Consequently, it is possible to judge whether or not the vibration of the drive shaft 500 can be suppressed, for example, by extracting a primary rotational component in the rotational fluctuation of the input shaft 420. The second threshold value in this case is a threshold value set for the extracted component.

Back in FIG. 9, if the detected rotational fluctuation is less than the second threshold value (the step S203: NO), a series of process operations is ended. In other words, it is judged that there is no problem in the currently performed torque control, and the control is continued. On the other hand, if the detected rotational fluctuation is greater than or equal to the second threshold value (the step S203: YES), the cancel torques added by the torque correcting unit 140 are corrected to be further increased (step S204). In other words, the effect of the suppression of the vibration of the drive shaft 500 can be increased. By virtue of this, even if the vibration cannot be sufficiently suppressed by one correction, additional correction can ensure the suppression of the vibration of the drive shaft 500.

Incidentally, after the cancel torques are increased, it is judged again whether or not the detected rotational fluctuation is greater than or equal to the second threshold value (step S205). If the detected rotational fluctuation is greater than or equal to the second threshold value (the step S205: YES), the process in the step S204 is performed again. In other words, the cancel torques added by the torque correcting unit 140 are further increased again. As described above, the increase in the cancel torque is repeated until the detected rotational fluctuation becomes less than the second threshold value. Thus, it is possible to make it extremely certain to suppress the vibration of the drive shaft.

As explained above, according to the control apparatus for the hybrid vehicle in the embodiment, since the cancel torques are added by the torque correcting unit and the correction is performed such that the torques of the MG1 and the MG2 are directed opposite to each other, it is possible to preferably suppress the vibration of the drive shaft caused by the torque pulsation and the mount vibration caused by the stator reaction forces.

The present invention is not limited to the aforementioned embodiments, but various changes may be made, if desired, without departing from the essence or spirit of the invention which can be read from the claims and the entire specification. A control apparatus for a hybrid vehicle, which involves such changes, is also intended to be within the technical scope of the present invention.

DESCRIPTION OF REFERENCE CODES 1 hybrid vehicle
10 hybrid drive apparatus
100 ECU
110 torque calculating unit
120 shift judging unit
130 mount temperature detecting unit
140 torque correcting unit
150 MG controlling unit
160 rotational fluctuation detecting unit
200 engine
310 MG1-side power transmission mechanism
320 MG2-side power transmission mechanism
410 damper
420 input shaft
500 drive shaft
MG1, MG2 motor generator

The invention claimed is:
1. A control apparatus for a hybrid vehicle, the hybrid vehicle comprising: an internal combustion engine; power elements including a first electric motor and a second electric motor; and a drive shaft for transmitting respective torques outputted from the power elements to an axle, said control apparatus comprising:
   a torque determining device for determining respective divided torques to be outputted from the first electric motor and the second electric motor on the basis of total torque required for driving of the hybrid vehicle;
   a torque correcting device for correcting the respective divided torques of the first electric motor and the second electric motor such that pulsation torque of the internal combustion engine on the drive shaft and mount vibration caused by stator reaction forces are canceled by the respective divided torques outputted from the first electric motor and the second electric motor and such that the respective divided torques of the first electric motor and the second electric motor are directed opposite to each other in either a clockwise direction or a counterclockwise direction with respect to the drive shaft; and a controlling device for controlling each of the first electric motor and the second electric motor so as to output respective one of the corrected divided torques.

2. The control apparatus for the hybrid vehicle according to claim 1, wherein said control apparatus comprises a driving detecting device for detecting whether or not the hybrid vehicle is driving, said torque determining device determines the divided torques so as to output the torques from both the first electric motor and the second electric motor if the hybrid vehicle is not driving and determines the divided torque so as to output the torque from either the first electric motor or the second electric motor if the hybrid vehicle is driving, and said torque correcting device performs the correction such that the pulsation torque of the internal combustion engine on the drive shaft is canceled by the divided torque outputted from either the first electric motor or the second electric motor if the hybrid vehicle is driving.

3. The control apparatus for the hybrid vehicle according to claim 1, wherein said control apparatus comprises a temperature detecting device for detecting temperature of a mount for fixing the power elements to a body of the hybrid vehicle, said torque determining device determines the divided torques so as to output the torques from both the first electric motor and the second electric motor if the temperature of the mount is less than a first threshold value and determines the divided torque so as to output the torque from either the first electric motor or the second electric motor if the temperature of the mount is greater than or equal to the first threshold value, and said torque correcting device performs the correction such that the pulsation torque of the internal combustion engine on the drive shaft is canceled by the divided torque outputted from either the first electric motor or the second electric motor if the temperature of the mount is greater than or equal to the first threshold value.

4. The control apparatus for the hybrid vehicle according to claim 1, wherein said control apparatus comprises a rotational fluctuation detecting device for detecting rotational fluctuation of the drive shaft, and said torque correcting device additionally corrects the divided torques to increase a cancel torque for the pulsation torque of the internal combustion engine if the rotational fluctuation of the drive shaft is greater than or equal to a second threshold value even though the divided torques are corrected.

5. The control apparatus for the hybrid vehicle according to claim 4, wherein said torque correcting device stops the correction of the divided torques if the rotational fluctuation of the drive shaft is greater than or equal to a third threshold value even though the divided torques are corrected, and said controlling device controls each of the first electric motor and the second electric motor so as to output the divided torques which are not corrected.

* * * * *